(12) United States Patent
Parkhill et al.

(10) Patent No.: US 6,725,539 B2
(45) Date of Patent: Apr. 27, 2004

(54) MARKER POST AND MANUFACTURING METHOD

(75) Inventors: Jason N. Parkhill, Gainesville, TX (US); Steve Ray Stevens, Valley View, TX (US); Glen Joseph Voth, Gainesville, TX (US)

(73) Assignee: Petroflex, N.A., Inc., Gainesville, TX (US)

( * ) Notice: Subject to any disclaimer, the term of this patent is extended or adjusted under 35 U.S.C. 154(b) by 0 days.

(21) Appl. No.: 10/262,290

(22) Filed: Sep. 30, 2002

(65) Prior Publication Data

US 2004/0060500 A1 Apr. 1, 2004

(51) Int. Cl.[7] ............................................... H05K 13/00
(52) U.S. Cl. .............................. 29/854; 29/857; 29/868; 29/505; 29/506
(58) Field of Search ........................ 29/854, 857, 868, 29/837, 505, 506; 116/201, 209; 264/320, 322; 425/393; 361/320, 323, 321.6, 371

(56) References Cited

U.S. PATENT DOCUMENTS

| 4,522,530 A | * | 6/1985 | Arthur ........................ 404/10 |
| 4,649,678 A | * | 3/1987 | Lamson ....................... 52/103 |
| 4,971,479 A | * | 11/1990 | Byers et al. ................. 405/232 |
| 5,186,119 A | * | 2/1993 | Hlavin ........................ 116/222 |
| 5,863,154 A | * | 1/1999 | Olsen .......................... 405/232 |

* cited by examiner

*Primary Examiner*—Carl J. Arbes
*Assistant Examiner*—Tu Nguyen
(74) *Attorney, Agent, or Firm*—Mark E. Brown

(57) ABSTRACT

A method of manufacturing a marker post includes the steps of preheating a tubular barrel adjacent to a lower end thereof to soften same and deforming the tubular barrel lower end to form a flange assembly. The pre-softened tubular barrel is received in a barrel holder. A mandrel assembly is reciprocated into and out of engagement with the barrel lower end. The mandrel assembly reshapes the barrel lower end to form the flange assembly.

3 Claims, 7 Drawing Sheets

MARKER POST AND MANUFACTURING METHOD

Background of the Invention

1. Field of the Invention

The present invention relates generally to markers, and in particular to a terrestrial marker post adapted for locating buried utility lines and the like, and a method and apparatus for manufacturing same.

2. Description of the Prior Art

Marker posts are commonly used for marking the locations of various underground objects. For example, utility lines are often buried. In many locations utility lines are required to be placed underground for aesthetic reasons.

In recent years fiber-optic cable networks have been installed in many parts of the country. A common installation procedure involves trenching or boring underground and placing the fiber-optic cables within protective plastic conduit. The fiber-optic cables have many advantages for telecommunications, including the ability to efficiently transmit large amounts of data. However, the potential earnings losses associated with an inoperative fiber-optic cable can be very large, because relatively high revenues are commonly generated from their transfer of correspondingly large amounts of data for telecommunications customers.

Excavating equipment and operations pose significant threats to buried utility lines, including fiber-optic cables. Natural gas pipelines, for example, pose an explosion risk. Electrical power lines have attendant risks of damage and injuries related to electrical power. Accidentally severing a buried fiber-optic cable can subject an excavation contractor to significant liability for interrupted service.

In order to control such risks, utility companies and service providers have marked the locations of their underground lines and provided information regarding same, such as toll-free numbers, which excavators are encouraged to "call before digging". A common pre-existing type of marker includes a length of plastic pipe with one end embedded in the ground and the other end mounting a cap. The cap can have printed thereon warning information, and can be color-coded for the type of buried utility, e.g.: blue—water; yellow—natural gas; red—electric; orange (white)—fiber-optic, etc. Such utility markers tend to be relatively effective and are widely recognized. Another advantage is that they are relatively easy to install, but unfortunately many of the prior art designs were easily removed. For example, the surrounding soil can often be loosened by manipulating the above-ground portion of a marker post. The prior art marker posts were thus susceptible to vandalism, theft, etc. A previous solution to this problem involved extending a peg through the embedded portion of the marker post and into the surrounding soil for pullout resistance. However, the pegs and their receivers represented additional components and installation steps, thus adding to the installed costs of the marker posts. Moreover, installing the pegs was sometimes overlooked whereby the marker posts were unprotected.

Heretofore there has not been available a marker post and manufacturing method with the advantages and features of the present invention.

DETAILED DESCRIPTION OF THE PREFERRED EMBODIMENTS

Figure 1:
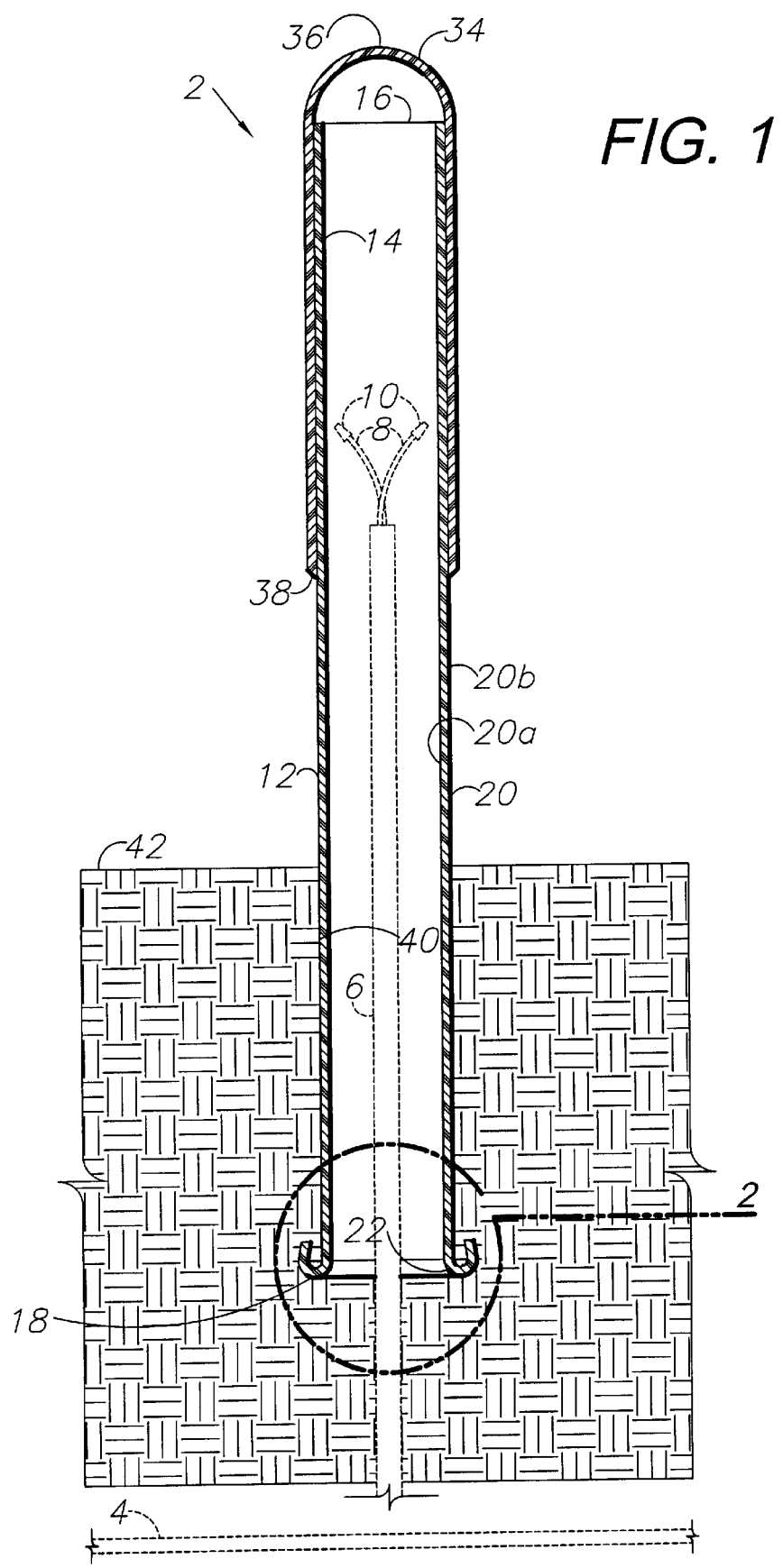
FIG. 1 is a vertical, cross-sectional view of a marker post embodying the present invention.
Figure 2:
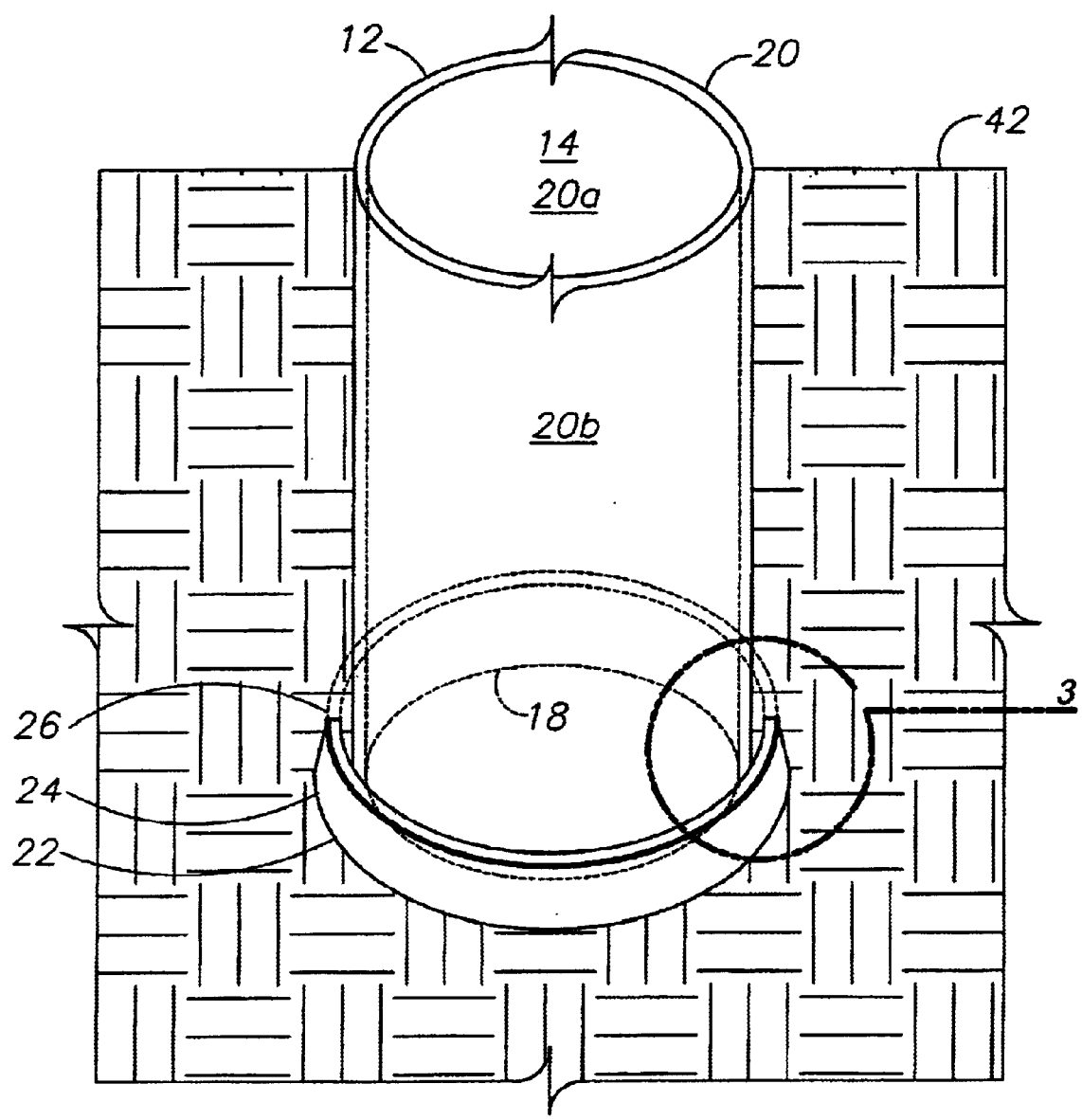
FIG. 2 is an enlarged, fragmentary, cross-sectional view thereof, taken generally within circle 2 in FIG. 1.

I. Introduction and Environment.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, "up" and "down" refer to the invention as oriented in FIG. 1. The words "inwardly" and "outwardly" refer to directions toward and away from, respectively, the geometric center of the embodiment being described and designated parts thereof. Said terminology will include the words specifically mentioned, derivatives thereof and words of a similar import.

Referring to the drawings in more detail, the reference 2 generally designates a marker post embodying the present invention. Without limitation on the generality of useful applications of the invention, the marker post 2 is shown over a buried fiber-optic cable 4, which is run through buried plastic conduit. The marker post 2, being hollow, is optionally adapted to receive a length of conduit 6 containing conductors 8, which can be capped or temporarily terminated (e.g., with wire nuts 10 as shown) for future splicing in connection with a future transformer location or an expansion or extension of utility services.

II. Marker Post 2.

The marker post 2 includes a tubular barrel 12 with a bore 14 extending between and open at upper and lower ends 16, 18. The tubular barrel 12 can comprise any suitable thermoplastic material, such as polyethylene, and is formed with a sidewall 20 having interior and exterior surfaces 20a, b.

Figure 3:
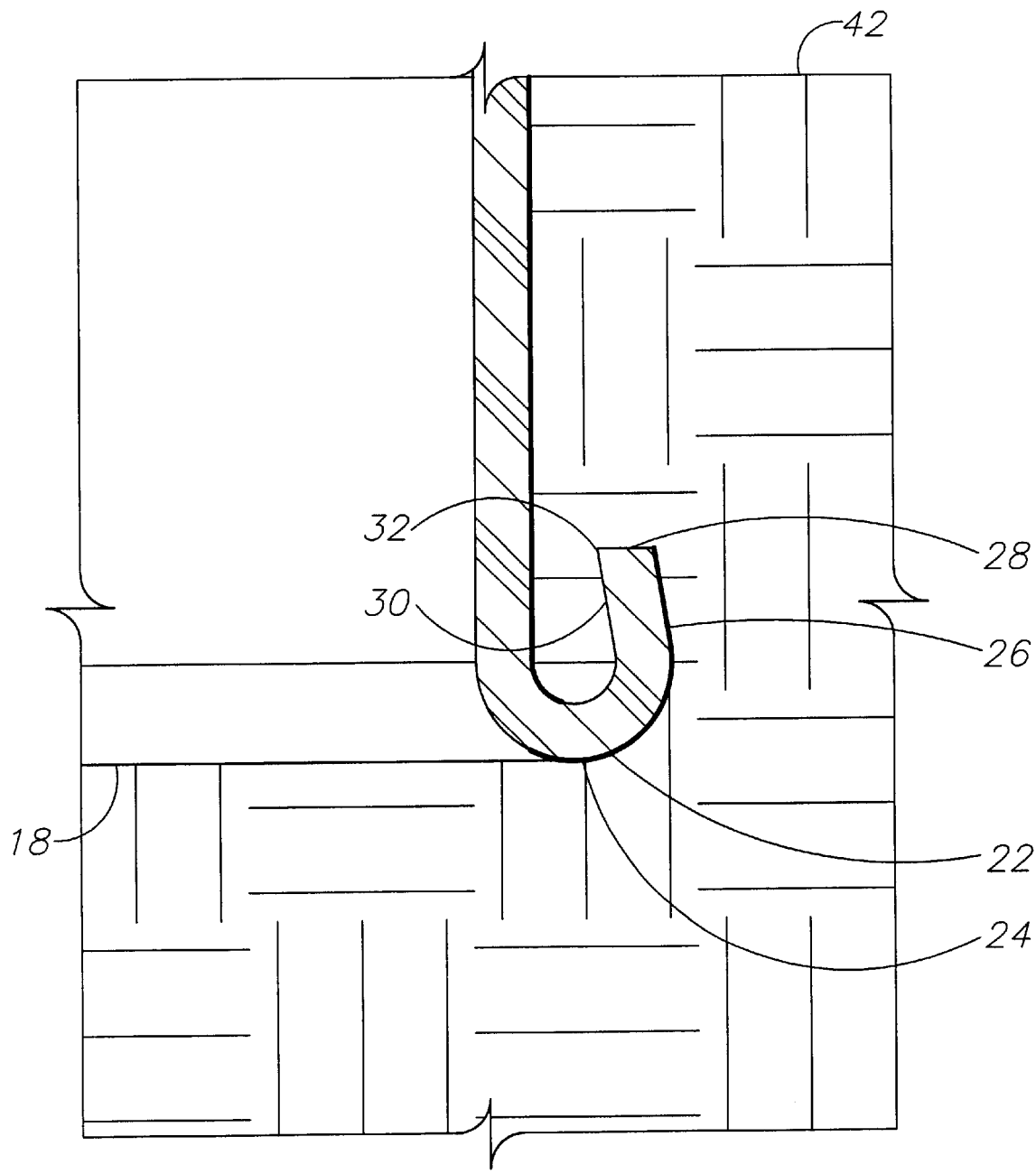
FIG. 3 is a further enlarged, fragmentary, cross-sectional view thereof, taken generally within circle 3 in FIG. 2.

An annular flange assembly 22 is formed at the tubular barrel lower end 18 and includes an extension portion projecting radially outwardly from the tubular barrel lower end 18. As shown in FIG. 3, in cross section the extension portion 24 curves through slightly more than 180 degrees, and displays a concave configuration. An annular return portion of the flange assembly 22 extends upwardly and radially inwardly from the extension portion 24, and terminates at a flange assembly rim 28. An upwardly-open, annular channel or groove 30 is formed between the tubular barrel outer surface 20a and the return portion 26, and is upwardly-open at an annular channel clearance 32. The channel 30 is closed at its lower end by the flange assembly extension portion 24. The configurations of the flange assembly 22 and the channel 30 formed thereby tend to resist pull-out of the implanted marker post 2.

A cap 34 is provided for conveying information, which can be printed thereon and typically comprises a warning such as "WARNING BURIED FIBER OPTIC CABLE IN THIS VICINITY", together with graphic warnings, contact information such as toll-free numbers, which can be called for additional information, etc. The cap 34 has a closed upper end 36, which can generally be configured like a hemisphere, and an open lower end 38. The cap 34 telescopically receives through its open lower end 38 the tubular barrel 12 adjacent to its upper end 16. The cap 34 can comprise any suitable material, such as a suitable thermoplastic adapted to receive printing thereon by any suitable technique, such as silkscreening.

In operation, the marker post is adapted for embedding in soil to a sufficient depth (generally about 1 to 2 feet), as shown in FIG. 1. Power augers, post hole diggers and other suitable digging tools can be used for digging a hole 40 to receive the marker post 2. The hole 40 is preferably sized to accommodate the flange assembly 22, i.e. slightly oversized with respect to the tubular barrel 12. The concave configuration of the flange assembly 22 facilitates inserting the marker post 2. Moreover, this concave configuration, with the corresponding curved cross-sectional configuration, provides considerable structural strength for the flange assembly 22. The marker post 2 is inserted into the hole 40 to refusal, whereat a substantial portion of its length is left aboveground. The surrounding soil 42 is then backfilled around the tubular barrel 12, and occupies the channel 30 for engagement by the flange assembly 22 whereby the marker post 2 effectively resists pullout. The upwardly-open configuration of the channel 30 tends to resist pullout throughout the embedded length of the tubular barrel 12. Thus, even lifting the marker post 2 somewhat out of the hole 40 will not cause it to release. Rather, the configuration of the flange is likely to cause the marker post 2 to continue to resist pullout, thus hopefully discouraging its unauthorized removal.

III. Manufacturing Method and Apparatus.

Without limitation on the generality of useful methods and apparatus for manufacturing the marking post 2, an exemplary method is described using a manufacturing apparatus 52, as shown in FIGS. 4, 5a, 5b and 5c.

Figure 4:
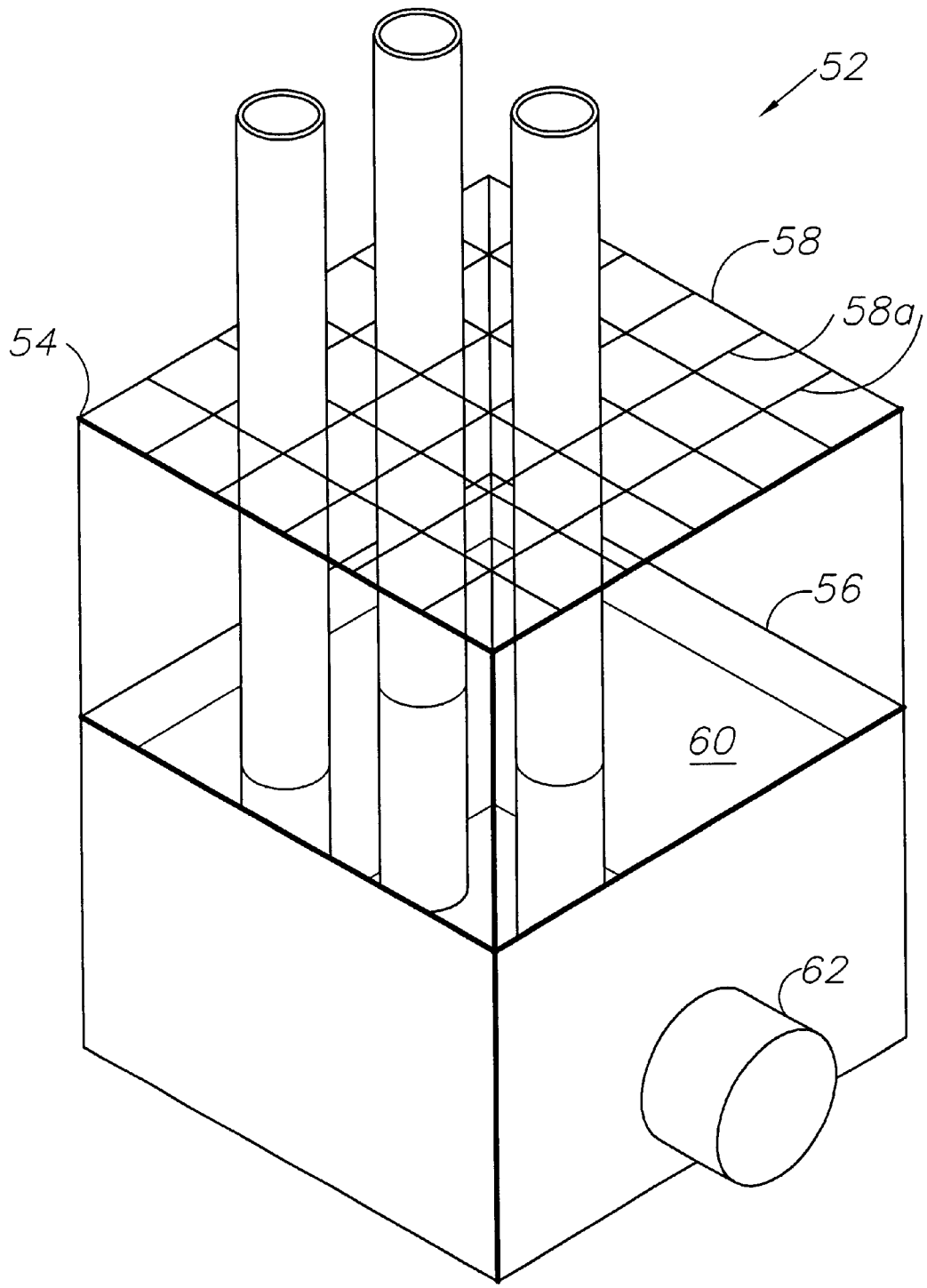
FIG. 4 is a perspective view of a warming tank used in the practice of the method of the present invention.

FIG. 4 shows a warming tank 54 with an open-top vessel 56 mounting a grid 58, which provides multiple barrel receivers 58a adapted for maintaining the tubular barrels 12 in upright positions. Lower portions of the tubular barrels 12 are immersed in heat transfer liquid 60, which is heated by a thermostat-controlled heater 62 mounted on the vessel 56. The heat transfer liquid 60 can include glycol or some other suitable component to raise its boiling temperature. The polyethylene tubular barrels 12 soften and become pliable at about 165 degrees Fahrenheit, so the heat transfer liquid 60 temperature can be maintained in the range of approximately 185 degrees to 200 degrees Fahrenheit for effective preheating of the tubular barrels 12 to a softened, pliable temperature.

Figure 5A:
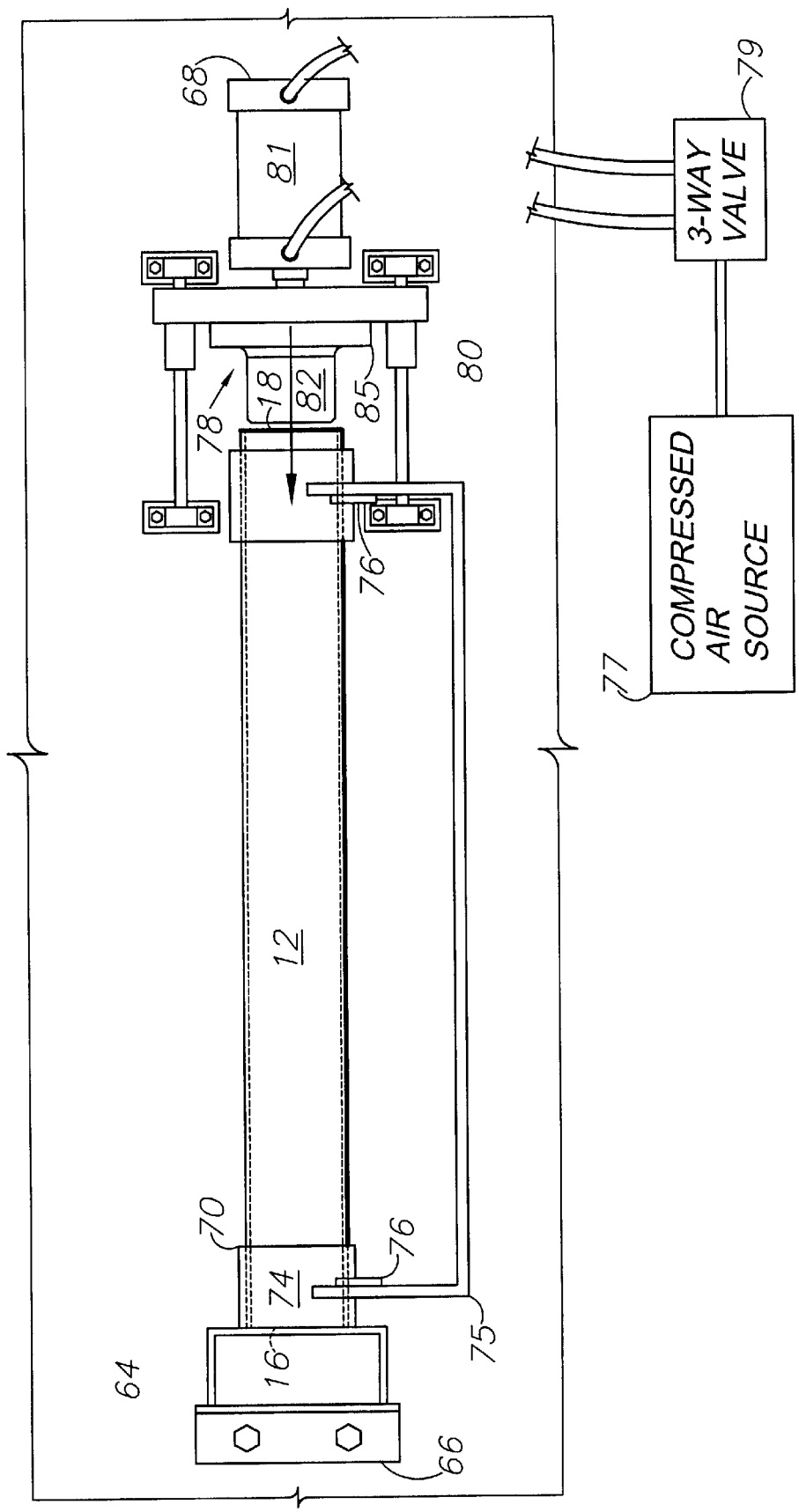
FIG. 5a is a top plan view of a barrel holder used in the practice of the method of the present invention.
Figure 5B:
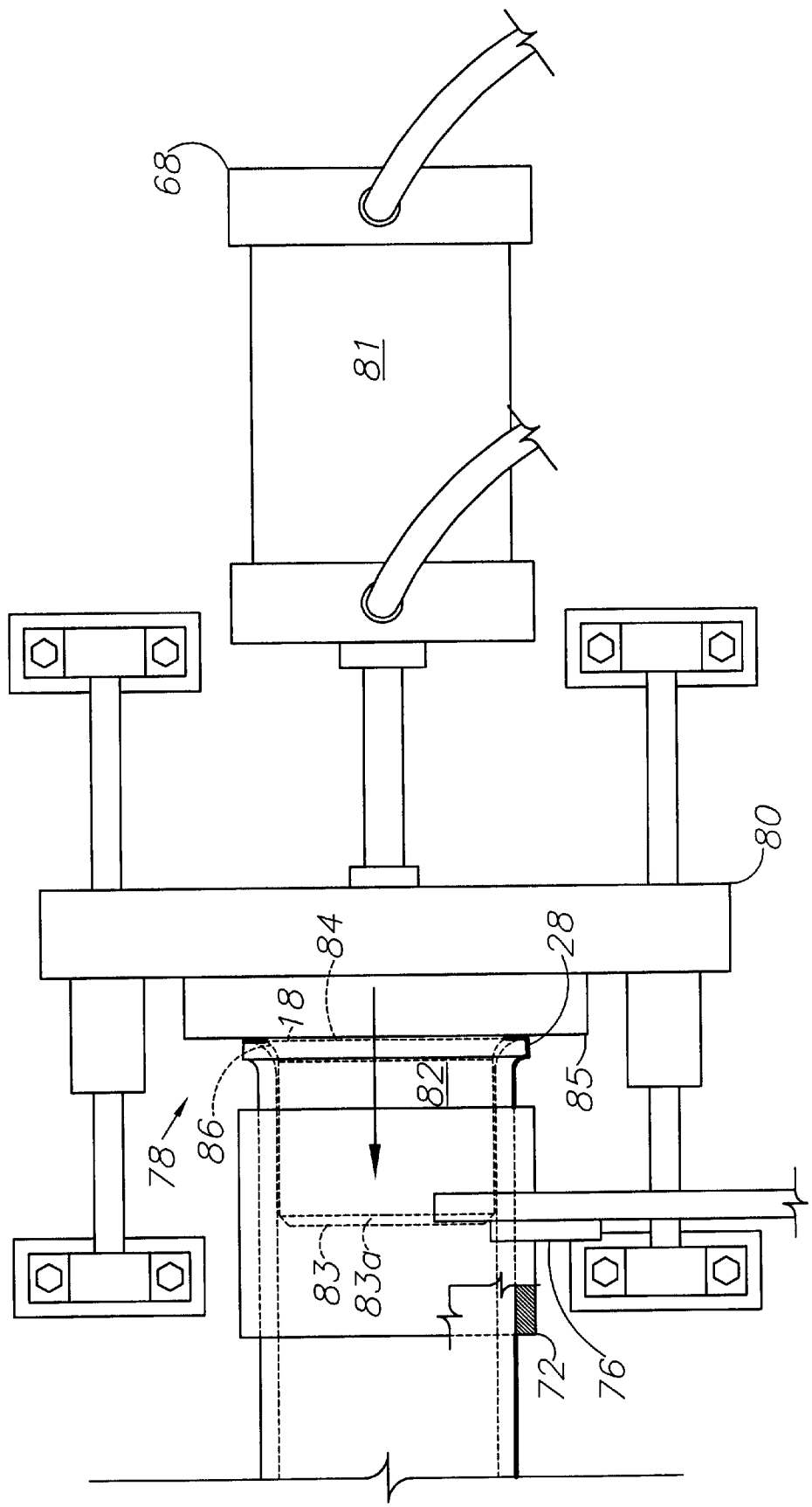
FIG. 5b is a fragmentary, top plan view of the barrel holder, particularly showing a mandrel plug thereof advancing into the lower end of the tubular barrel.
Figure 5C:
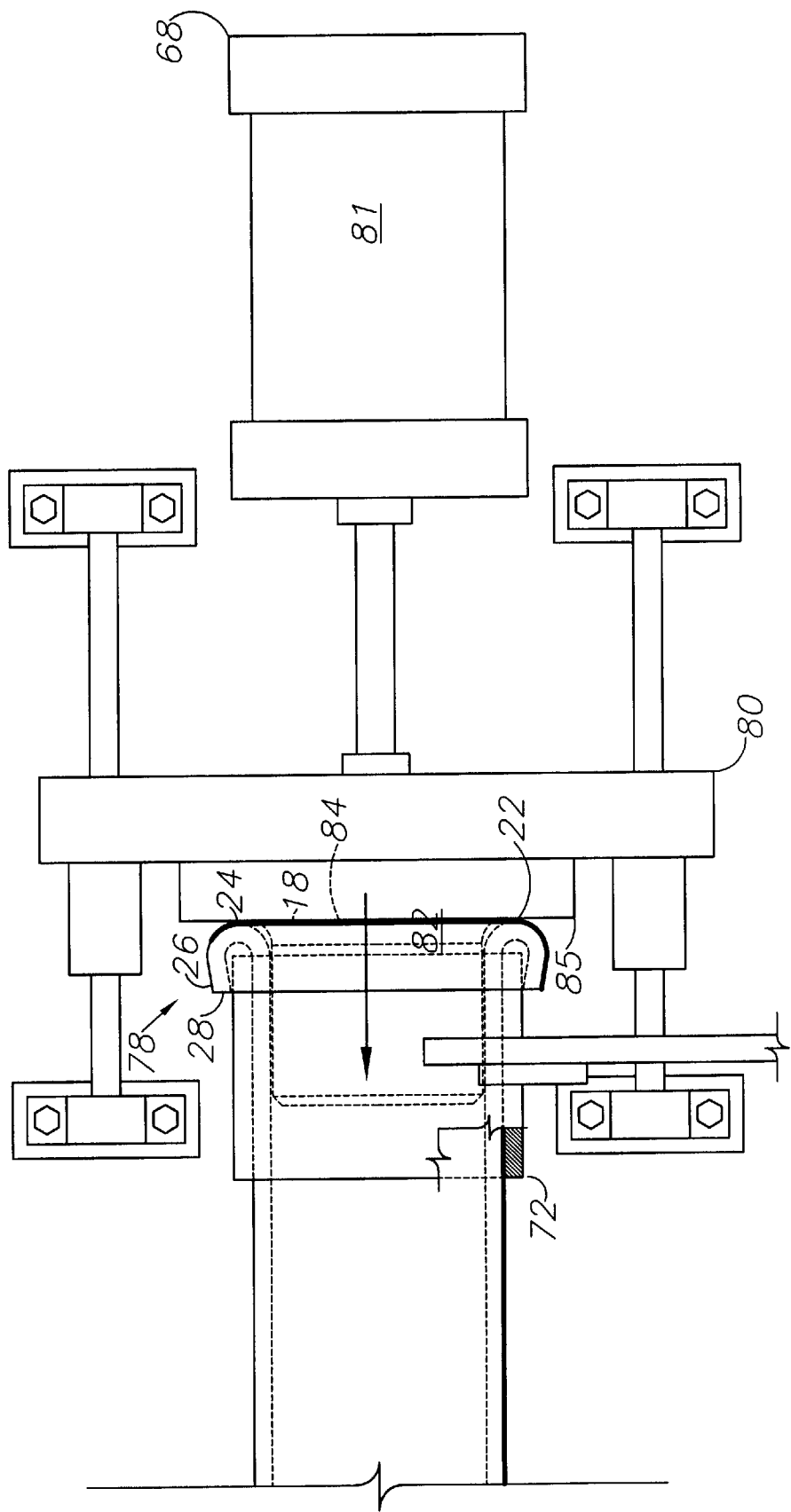
FIG. 5c is a fragmentary, top plan view of the barrel holder, particularly the mandrel plug fully advanced into the barrel lower end.

FIGS. 5a–c show formation of the flange assembly 22 on a clamping barrel holder 64, which includes first and second ends 66, 68 with respective split sleeves 70 each comprising a fixed or lower half 72 and a movable or upper half 74. Each upper sleeve half 74 is hingedly mounted on a respective lower sleeve half 72 and is raised and lowered with respect thereto between open and closed positions by a handle 75. Latching mechanisms 76 are provided for locking the respective sleeves 70 in their closed positions.

A mandrel assembly 78 is located at the barrel holder second end 68 and includes a slide subassembly 80 slidably movable between extended and retracted positions (FIGS. 5a and 5c respectively) by a linear actuator, comprising a piston-and-cylinder unit 81. Without limitation on the generality of useful linear actuators, a double-acting pneumatic piston-and-cylinder unit is shown and is adapted for connection to a compressed air source 77 through a three-way valve 79. The valve 79 can including a lever for manual operation, a foot pedal for foot operation, a solenoid for electrical operation, etc. The linear actuator 82 is shown in its retracted position in FIG. 5a, with a mandrel plug 82 thereof generally aligned with the barrel bore 14 and positioned in close proximity to the barrel lower end 18.

The mandrel plug 82 is generally cylindrical with a distal end 83 chamfered at 83a to facilitate insertion into the barrel bore 14 and a proximate end 84 mounted on a mandrel base 85. The mandrel plug 82 has an annular, convex forming rim 86 (FIGS. 5b, 5c) located at the junction between its proximate end 84 and the base 85. The mandrel plug forming rim 86 is adapted for engaging the softened barrel lower end 18 and curving same through an angle of slightly more than 180 degrees, e.g., in the range of about 190 degrees to 220 degrees. As shown in FIG. 5c, the barrel lower end 18 generally doubles back on itself into engagement with the split sleeve 70, thus forming the flange assembly 22. In this position the slide subassembly 80 and the piston-and-cylinder unit 81 driving same are in their fully-extended positions. Retracting the piston-and-cylinder unit 82 retracts the slide subassembly 80 and withdraws the mandrel plug 82 whereby the formed barrel 12 can be removed.

It is to be understood that while certain forms of the present invention have been illustrated and described herein, it is not to be limited to the specific forms or arrangement of parts described and shown.

Having thus described the invention, what is claimed as new and desired to be secured by Letters Patent is:

1. A method of making marking posts comprising tubular thermoplastic barrels with upper ends and flanged lower ends, which method comprises the steps of:

providing a barrel with first and second ends and a bore extending between and open at said ends;

applying heat to said barrel lower end and thereby presoftening same;

restraining said barrel along the length thereof against axial movement;

providing a mandrel with a base, a mandrel plug mounted on and projecting generally perpendicularly from said base and an annular transition between said base and said plug;

providing said transition with a concave, curved configuration;

providing a linear actuator with extended and retracted positions;

mounting said mandrel on said linear actuator in alignment with said barrel bore;

placing said linear actuator in said retracted position;

advancing said linear actuator axially to its extended position;

telescopically advancing said mandrel plug into said barrel bore;

engaging said barrel first end with said mandrel transition;

deforming said barrel first end in a first, radial outward direction by advancing said mandrel into said barrel bore and thereby forming a barrel end extension portion;

further deforming sand barrel first end in a direction generally axial with respect to said barrel and radially towards same; and maintaining an upwardly-open channel formed by a spacing between said flange rim and said barrel.

2. The method according to claim 1, which includes the additional steps of:

forming said barrel from a thermoplastic material; and heating said thermoplastic material to a predetermined temperature at which said material becomes sufficiently soft for reshaping same.

3. The method according to claim 1, which includes the additional steps of:

placing said marker post at a buried electrical power line location;

extending a conduit from said buried electrical power line into said bore;

extending electrical power leads through said conduit and into said bore; and terminating said power lead with insulators within said bore.

* * * * *